No. 773,795. PATENTED NOV. 1, 1904.
O. G. & G. A. JOSEPH.
FASTENING.
APPLICATION FILED MAY 16, 1903.
NO MODEL.

No. 773,795. Patented November 1, 1904.

UNITED STATES PATENT OFFICE.

OWEN GLADSTONE JOSEPH AND GWILLYM ALCWYN JOSEPH, OF KENSINGTON, LONDON, ENGLAND.

FASTENING.

SPECIFICATION forming part of Letters Patent No. 773,795, dated November 1, 1904.

Application filed May 16, 1903. Serial No. 157,482. (No model.)

*To all whom it may concern:*

Be it known that we, OWEN GLADSTONE JOSEPH, gentleman, and GWILLYM ALCWYN JOSEPH, master jeweler, subjects of the King of Great Britain, residing at 46 Sinclair road, Kensington, London, England, have invented certain new and useful Improvements in Fastenings, of which the following is a specification.

The subject of the present invention relates to that description of fastening in which a headed stud is forced through a split opening or socket, so that the head of the stud becomes engaged by the lips of said opening or socket. This type of fastener has been applied for securing buttons, sealing and closing envelops, and for other purposes; and our invention has reference more particularly to sealing or securing envelops, cardboard boxes, labels, and analogous articles and for connecting the ends of a tape or other binding.

Hitherto the fasteners of the above-mentioned description have failed, generally because of their faulty construction, which enables the fastening to be tampered with, if not altogether disengaged one part from the other; and the object of our invention is to construct such fasteners in such a manner that the faults in and objections to such fasteners are obviated.

Figure 1:
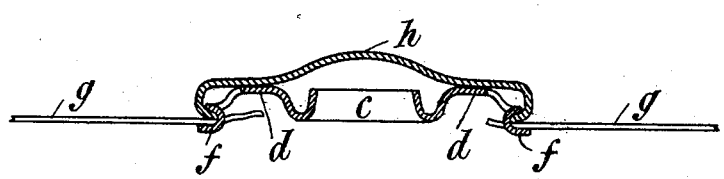
Figure 2:
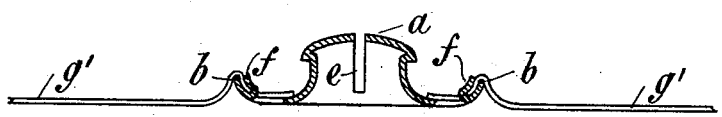

In the accompanying drawings, Figure 1 is a section of the improved construction of the socket portion of the fastening. Fig. 2 is a section of the improved construction of the stud portion of the fastening, and Fig. 3 is a section of the two portions locked together.

According to our invention we make use of a flanged or headed stud *a* to engage in a socket of a cap or cover *h;* but the flanged stud is of comparatively large diameter, as shown, (thus affording a greater interlocking surface,) and the disk from which the hollow flanged stud is struck up is dished so that its edge or periphery *b* projects upward. The socket is formed with an inwardly-projecting lip or rim *c*, approximately following the shape of the stud below the head, and the disk from which the socket is struck up is dished at *d* to receive the upturned edge or periphery *b* of the disk of the flanged stud. Thus when the two parts are interlocked the edges of the respective disks overlap, as shown in Fig. 3, the edge *b* of the stud-disk abutting against the dished or sunk portion *d* of the socket-disk and cap or button-cover, (or nearly so,) thereby preventing a knife or other instrument being inserted between the disks in an attempt to wrench the parts asunder. Preferably the necessary yielding of one part to engage behind the other is effected by splitting the hollow flanged stud, as at *e*, as this insures a more secure fastening than when the socket is split; but in consequence of the improved construction we may in some cases split the socket instead of the stud and still retain a far greater element of security than has hitherto been the case.

The two parts of the fastener are preferably secured to the respective parts of the article by means of barbs *f*, struck out of the substance of the disks and turned down after passing through the material *g g'* of the article, the attachment being effected in a suitable press or by other means.

Figure 3:
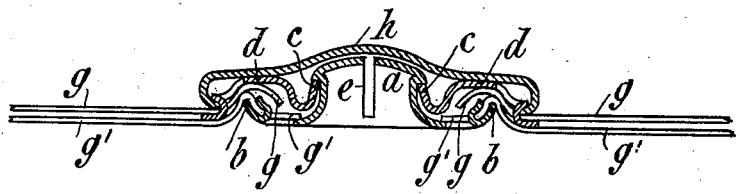

In use the material *g g'*, to which the fastener is attached, becomes located between the two parts thereof, as shown at Fig. 3, so that it also becomes dished and accommodates the overlapping of the edges of the disks between which it is situated. Thus any attempt to insert a knife between the parts of the fastener must perforate and cut the paper or other material of which the article is composed.

We claim—

1. In a fastening, the combination with a socket cap or cover and a flanged or headed stud which form the two parts of said fastening, the socket in said cap being adapted to engage under the head of the stud, of an annular dished portion in the under side of said socket cap or cover surrounding the socket thereof, and an annular upturned portion upon said flanged or headed stud adapted to enter and be located within said annular dished portion of the cap or cover and being overlapped thereby, substantially as set forth.

2. The combination of a cap or cover, a disk formed with a socket and an annular dished portion and fixed in said cap or cover forming one part of the fastening; a split headed stud formed with an annular upturned periphery upon its flange-plate forming the other part of said fastening; said socket being fashioned approximately to the exterior shape of the stud below the head and adapted to engage said head, and barbs on the peripheries of the cover and head portions for attaching the two parts of the fastening to the material of which the article to be fastened is composed, said annular dished portion overlapping the annular upturned periphery of the stud, as set forth.

3. The combination of a cap or cover, a disk attached thereto formed with a socket, an annular dished portion in said disk, forming one part of the fastening; and a headed stud engaged by said socket, an annular upturned rim formed on the flange-plate of said stud forming the other part of said fastening; and means such as the barbs described for attaching the two parts of said fastening to the respective portions of the article, said annular dished portion overlapping the upturned rim of the stud so as to prevent access thereto, as set forth.

Dated this 23d day of April, 1903.

OWEN GLADSTONE JOSEPH.
GWILLYM ALCWYN JOSEPH.

Witnesses:
GEORGE C. DOWNING,
WALTER J. SKERTEN.